(12) United States Patent
Blankson

(10) Patent No.: US 11,318,805 B2
(45) Date of Patent: May 3, 2022

(54) SUSPENSION ADJUSTMENT ASSEMBLY

(71) Applicant: R5 MSS Ltd., Gosport (GB)

(72) Inventor: William Blankson, Fareham (GB)

(73) Assignee: R5 MSS LTD, Gosport (GB)

(*) Notice: Subject to any disclaimer, the term of this patent is extended or adjusted under 35 U.S.C. 154(b) by 365 days.

(21) Appl. No.: 16/452,029

(22) Filed: Jun. 25, 2019

(65) Prior Publication Data
US 2020/0001677 A1    Jan. 2, 2020

(30) Foreign Application Priority Data

Jun. 28, 2018 (GB) ..................... 1810595

(51) Int. Cl.
*B60G 11/14* (2006.01)
*B60G 13/00* (2006.01)
(Continued)

(52) U.S. Cl.
CPC ............ *B60G 17/033* (2013.01); *B60G 11/14* (2013.01); *B60G 13/001* (2013.01);
(Continued)

(58) Field of Classification Search
CPC .... B60G 17/033; B60G 11/14; B60G 13/001; B60G 17/021; B60G 2204/61;
(Continued)

(56) References Cited

U.S. PATENT DOCUMENTS 3,503,601 A * 3/1970 Wells .................. F16F 3/04
267/169
9,162,548 B1 * 10/2015 Wakeman ............ B60G 15/063
(Continued)

FOREIGN PATENT DOCUMENTS

| CN | 203743273 U | 7/2014 | |
| FR | 972299 A * | 1/1951 | ........... B60G 17/021 |

(Continued)

OTHER PUBLICATIONS

Description Translation for FR 972,299 from Espacenet (Year: 1951).*

(Continued)

*Primary Examiner* — Jonathan Ng
*Assistant Examiner* — Daniel M. Keck
(74) *Attorney, Agent, or Firm* — Christopher R. Carroll; The Small Patent Law Group LLC

(57) ABSTRACT

A shock absorber assembly comprises two springs 11, 12 arranged in series so as, in use, to extend between a pair of spaced apart spring seats. A coupling member 13 is arranged between the adjacent ends 11b, 12a of the springs 11, 12. The coupling member 13 is adjustable and is formed by a shaft having a pair of flanges 14, 15 provided on the outer surface thereof. The shaft extends axially beyond each flange 14, 15 so as to extend inside the windings of the abutting spring ends 11b, 12a to locate the spring ends 11b, 12a on the coupler 13. Each flange 14, 15 engages an associated adjacent ends 11b, 12a of one of the springs 11, 12. At least one of said flanges 14, 15 is moveable longitudinally along the shaft so as to vary the longitudinal separation between the two flanges 14, 15 and thereby vary the preload on the springs 11, 12.

20 Claims, 7 Drawing Sheets

(51) Int. Cl.
  *B60G 15/06* (2006.01)
  *B60G 17/02* (2006.01)
  *B60G 17/033* (2006.01)
  *F16F 1/13* (2006.01)
  *F16F 3/04* (2006.01)

(52) U.S. Cl.
  CPC ......... *B60G 15/065* (2013.01); *B60G 17/021* (2013.01); *F16F 1/13* (2013.01); *B60G 2204/124* (2013.01)

(58) Field of Classification Search
  CPC ............ B60G 2500/30; B60G 2500/20; B60G 2202/12; B60G 2202/312; B60G 2204/124; B60G 15/065; B60G 2204/4604; B60G 17/005; B60G 2500/22; F16F 3/04; F16F 1/12; F16F 1/121; F16F 7/00; F16F 2230/0041; F16F 2230/0052; F16F 1/041; F16F 1/13
  See application file for complete search history.

(56) References Cited

U.S. PATENT DOCUMENTS

2011/0233836 A1\* 9/2011 Sawai .................. B60G 15/065
  267/166
2015/0308536 A1  10/2015 Smith
2017/0253102 A1  9/2017 Mason

FOREIGN PATENT DOCUMENTS

| JP | H11148526 A | 6/1999 |
| JP | 2006214453 A | 8/2006 |
| WO | 2015004676 A1 | 1/2015 |

OTHER PUBLICATIONS

UK IPO Search Report for GB 1810595.7 dated Jun. 5, 2019 (4 pages).
Examination Report dated Jan. 7, 2021 for corresponding Patent Application No. 19182022.4 (6 pages).

\* cited by examiner

SUSPENSION ADJUSTMENT ASSEMBLY

The present invention relates to improvements in sprung shock absorbers and more particularly to adjustment mechanisms for adjusting the spring loading of such sprung shock absorbers which include at least two springs arranged in parallel with each other.

Shock absorbers such as are used on car suspension systems are well known in the art. Typical such shock absorbers comprise a spiral spring which optionally winds around a central fluid filled shock damper strut. More particularly, the strut is formed by a strut housing in which is longitudinally moveable a strut shaft so as to be extendable from and retractable into the strut housing. The strut housing is fluid filled and the end of the strut shaft acts like a piston in said housing so that its longitudinal movement is dampened. A pair of spaced apart spring seats are provided on the strut, one connected to the housing and one to the shaft, such that as the shaft moves into and out of the housing, the spring is compressed or relaxed so as to control the shock absorbing capability of the shock absorber. This capability is, therefore, dependent on the spring constant of the spiral spring. IN a configuration without a strut, the spring seats are fixed, respectively to the body of the vehicle and to part of the wheel mount such as a wishbone and the spring extends therebetween.

In some applications, it is desirable to be able to adjust the pre-load of the spring, so as, for example, to be able to change the responsiveness shock absorber, change the ride height of the vehicle. To achieve that goal, applicant's own earlier patent application discloses a shock absorber in which one of said spring seats is configured to be adjustable relative to the part of the shock absorber on which it is mounted by way of a threaded mounting.

It is also known in the art to provide shock absorbers which include two more spiral springs associated with a single strut, the springs being arranged in series with each other with an intermediate coupling seat arrangements between adjacent ends of neighbouring springs so as to located the springs together in a reliable manner and transmit loads between them. Typically, such arrangements utilise spring having different spring constants to improve the performance of the shock absorber. One such arrangement is disclosed in US 2002/0038929. This arrangement teaches a part of springs of different lengths arranged in series with a flanged coupling member arranged between them. The coupling member is generally cylindrical with a central flange that provides the seat for the end of the spring on either side and a cylindrical engagement portion extending from either side of the flange, which engages inside the end winding of the associated spring to locate it relative to the flange and hold the flange in position against radial movement, the coupler then floating in position between the two springs and is held in place by the preload on each spring. In this arrangement, an adjuster of the type described above is also provided for allowing adjustment of the preloads on the springs. However, this arrangement can be difficult to adjust due to difficulty of access to the adjuster behind the vehicle wheel.

According to a first aspect of the present invention, there is provided a shock absorber assembly comprising at least two springs arranged in series so as, in use, to extend between a pair of spaced apart spring seats, and a coupling member arranged between the or each pair of adjacent ends of neighbouring springs, wherein the coupling member is adjustable and is formed by a shaft having a pair of flanges provided on the outer surface thereof, the shaft extending axially beyond each flange so as to extend inside the windings of the abutting spring ends to locate the spring ends on the coupler, each flange engaging one of the adjacent ends of the neighbouring springs, at least one of said flanges being moveable longitudinally along the shaft so as to vary the longitudinal separation between the two flanges and thereby vary the preload on the springs.

A shock absorber in accordance with the invention has the advantage that, by incorporating the adjustment mechanism into the coupler, it is more easily accessible for adjustment on the vehicle, without, for example, necessitating removal of the wheel. Also, the number of parts required are reduced as a separate adjuster at the top or bottom of the strut is not required, making it easier to retro-fit to existing shock absorbers, and it also allows variation of the relative preloads between the springs in a manner not possible with the prior art arrangements.

A plurality of springs may be provided, said plurality of springs being arranged in series with each other so as to be distributed longitudinally between the spring seats. At least one adjustable coupler is then includes in line with the springs and arranged between one pair of the springs. Preferably, however, an adjustable coupler is provide between each pair of adjacent spring ends so as to provide the maximum scope for adjustment of the shock absorber.

According to another aspect of the present invention, there is provided an adjustable spring coupler for a shock absorber, comprising a coupling member formed by a shaft having a pair of flanges provided on the outer surface thereof, the shaft being sized so as to extend, in use, inside the windings of abutting spring ends of at least a pair of springs arranged in series between a pair of spring seats mounted on the shock absorber to locate the spring ends on the coupler, each flange engaging one of the adjacent ends of the neighbouring springs, at least one of said flanges being moveable longitudinally along the shat so as to vary the longitudinal separation between the two flanges and thereby, in use, to vary the preload on the springs.

The shaft is preferably hollow so as to optionally allow a suspension strut to extend therethrough. The shaft is preferably a cylindrical member having a circular cross-section but other shapes are also possible and are understood to be within the scope of the invention as described.

Preferably, the shaft is a cylindrical member having a thread formed on at least part of its outer surface, the at least one adjustable flange having an internal thread by means of which it mounts on the cylindrical member and is longitudinally adjustable therealong. The other of the flanges may be fixedly mounted on the cylindrical member or may also be longitudinally moveable therealong to facilitate a wider range of adjustment options. Other adjustment arrangements may also be used such as a retaining collar 19 (shown in FIG. 2), or the like.

Stop means may be associated with the or each adjustable flange to enable it to be locked in position against unintentional longitudinal movement. The stop means may take the form, for example, of a lock ring or nut which winds up behind the adjustable flange, a locking collar 17 which engages between the flanges to prevent them moving back towards each other, locking pins 18 or the like.

The outer dimension of the shaft is preferably sized to be a close tolerance fit inside the springs in which it engages to minimise lateral movement of the springs on the coupler. In particular, one end of the shaft may have a different size or diameter (if circular) to the other end to allow for close tolerance engagement in springs of different sizes. A circular cross section is advantageous as it facilitates formation of a thread on the outer surface and also will form a better engagement within the neighbouring spring ends between which the coupler engages.

In order that the invention may be well understood, there will now be described an embodiment thereof, given by way of example, reference being made to the accompanying drawings, in which.

Figure 1:
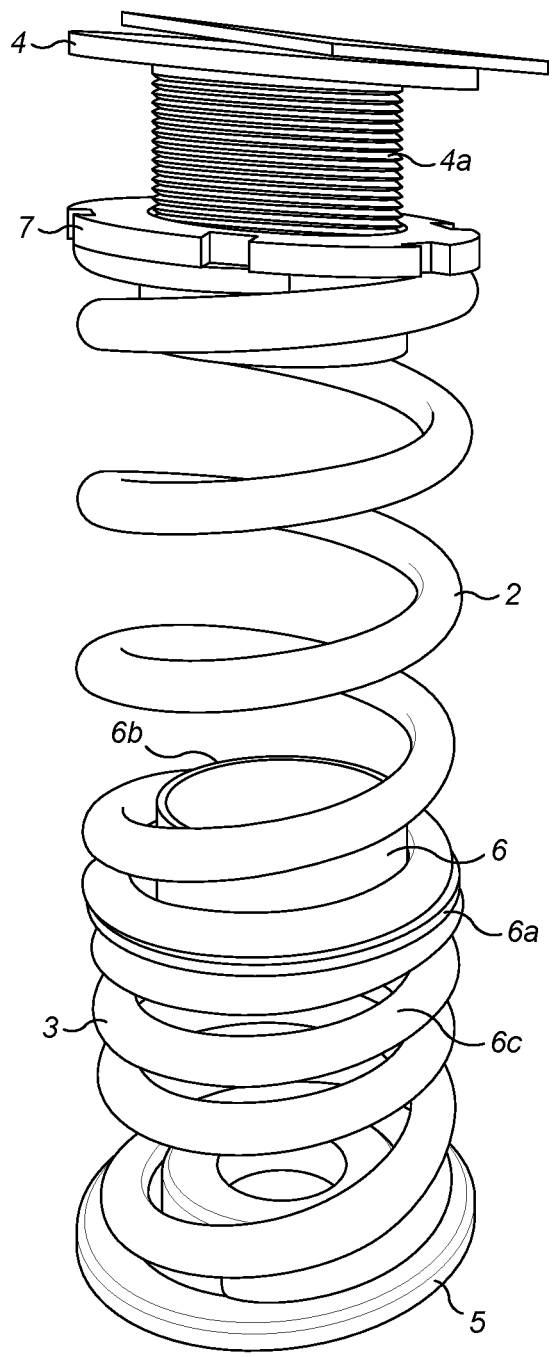
FIG. 1 is a prior art spring arrangement.

Referring first to FIG. 1, there is shown an example of applicant's own earlier prior art arrangement. A pair of springs 2, 3 are arrange in series between a pair of spring seats 4, 5. A coupler 6 is engaged between the neighbouring ends 2b, 3a of the springs so as to maintain the springs in position. More particularly, the coupler 6 has a central flange 6a with a shaft 6b, 6c extending axially on either side of the flange 6a so as to extending inside the windings of the springs 2, 3, and thereby prevent the spring from moving radially relative to the coupler 6.

The upper spring seat 4 is similarly formed as a shaft which extends into the windings of the abutting end 2a of the spring 2 so as to retain it in position. The outer surface 4a of the shaft of the upper spring seat 4 is threaded and has a flange member 7 against which the upper end 2a of the spring 2 engages. The flange member 7 is threadably mounted on the outer surface 4a of the shaft so as to be longitudinally moveable along the shaft by winding along the thread. In this way, the compression of the spring can be adjusted.

Figure 2:
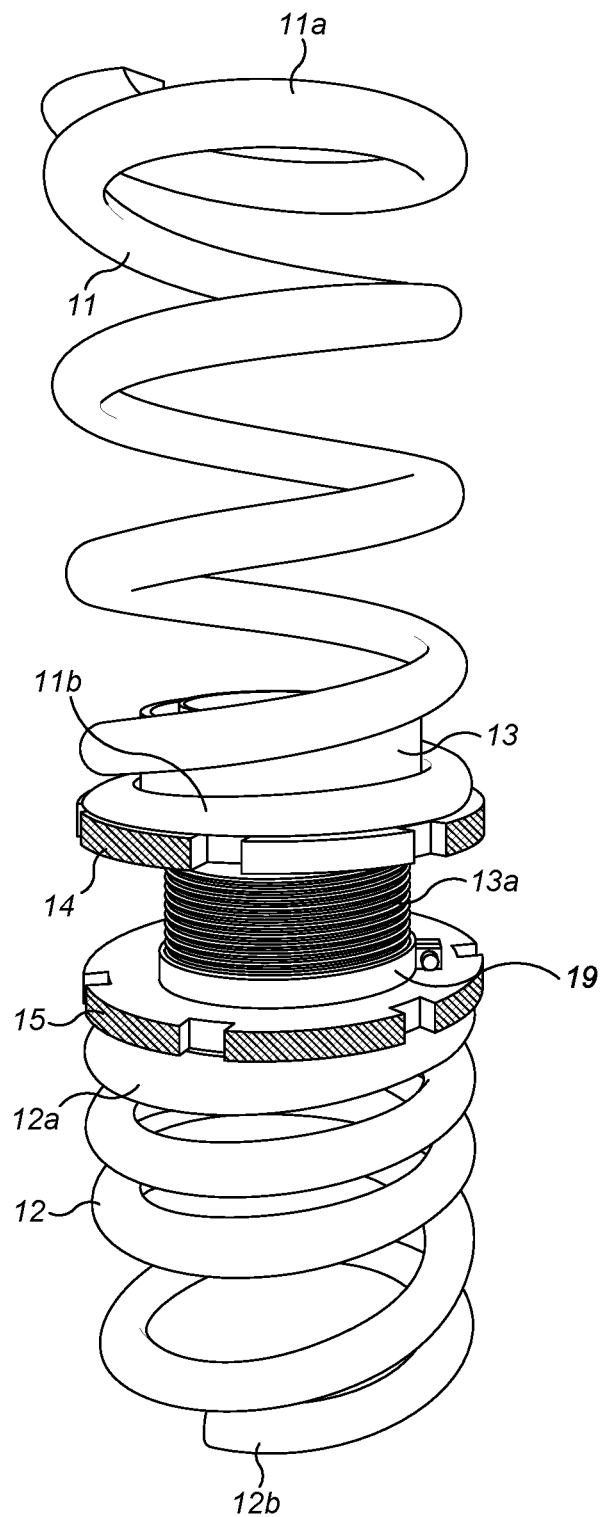
FIG. 2 is an exemplary embodiment of a spring arrangement according to the invention.
Figure 3:
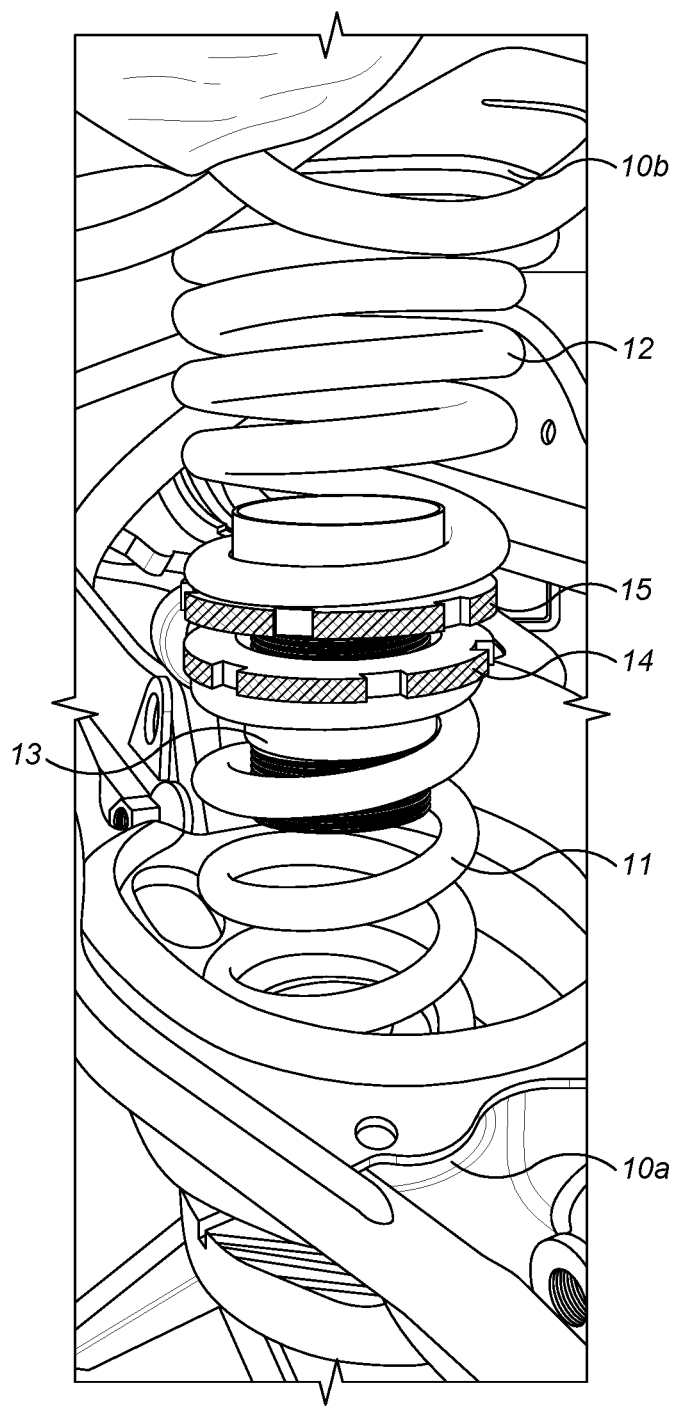
FIG. 3 is the spring arrange of FIG. 2 installed in position in a vehicle.
Figure 4:
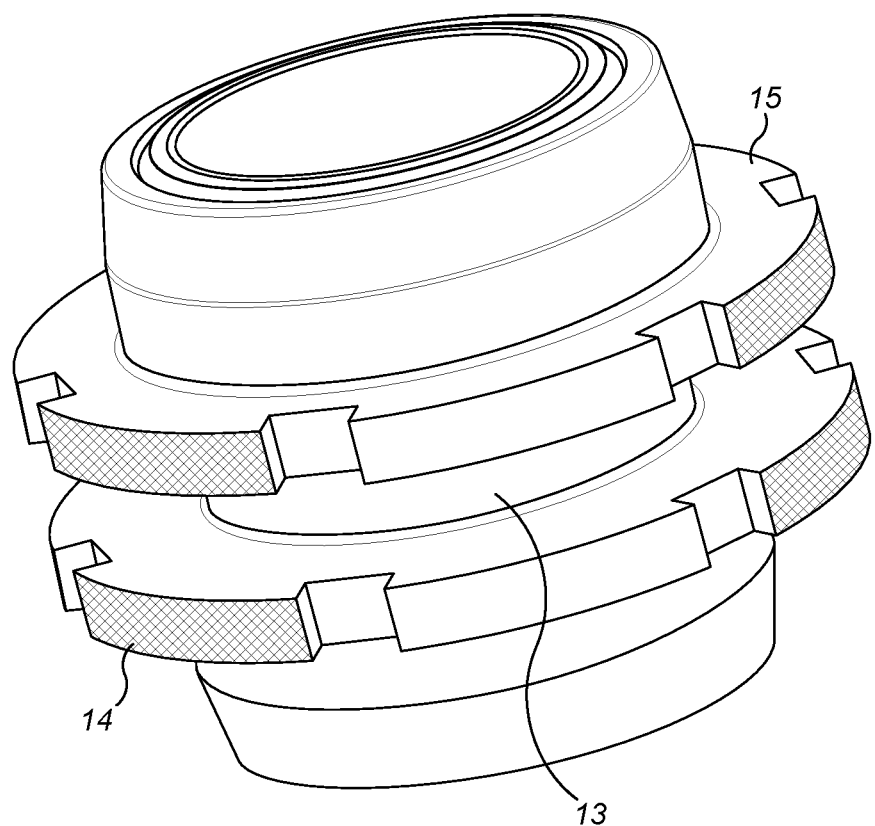
FIG. 4 is a perspective view of a coupler according to the invention.

Referring now to FIG. 2, there is shown a suspension spring arrangement according to the present invention. As with the prior art arrangement of FIG. 1, the arrangement includes a pair of springs 11, 12 which are arranged in series. In use, as shown in FIG. 3, the remote ends of the springs engage in spring seats 10a, 10b to retain them in position, which will typically be located for the one end 11a on a lower wish bone or similar component which carries the wheel with which the arrangement is to operate, and for the other end 12b on the chassis of the vehicle above the wheel.

Figure 5A:
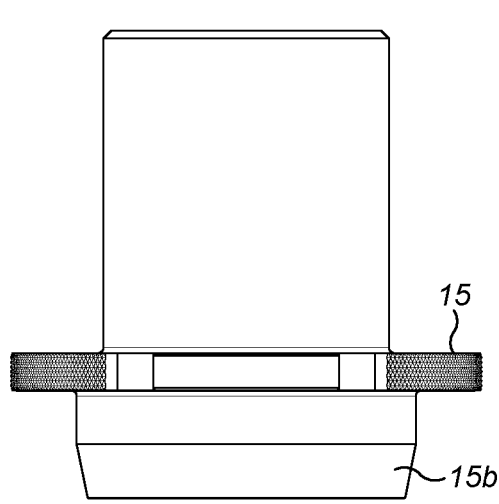
FIGS. 5a to 5c are views of a cylindrical member which forms part of the coupler of FIG. 4.
Figure 5B:
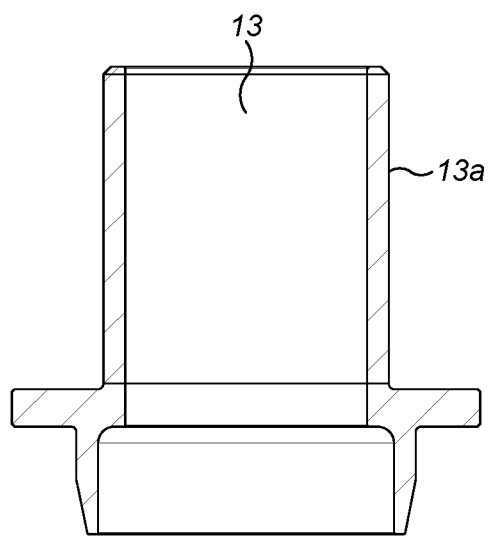
Figure 5C:
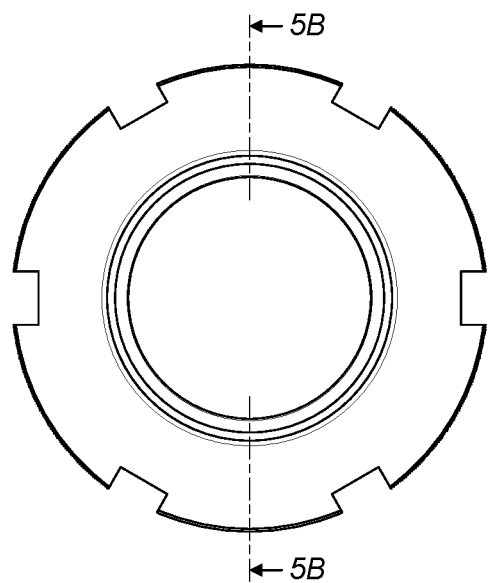

A coupler 13 is similarly engaged between the neighbouring ends 11b, 12a of the springs 11, 12, but in difference to the prior art arrangement, the coupler 13 has a pair of flanges 14, 15 and has a thread 13a formed on its outer surface. As illustrated in FIG. 5b, the lower flange 15 is integrally formed with the coupler so as to be in a fixed longitudinal position along the coupler 13 and is spaced apart from the lower end of the coupler such that an axial extension 15b is formed on the coupler below the flange 15 for engaging into the inside of the coils of the spring 12 in the same fashion as in the prior art.

Figure 6A:
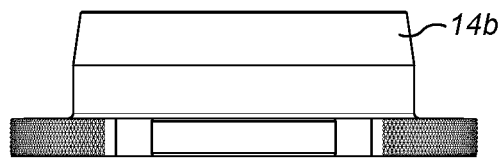
FIGS. 6a to 6c are views of an adjustable flange member which forms part of the coupler of FIG. 4.
Figure 6B:
Figure 6C:
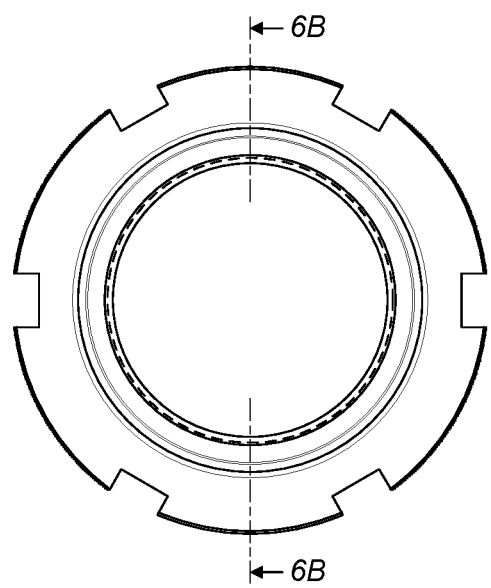
Figure 7A:
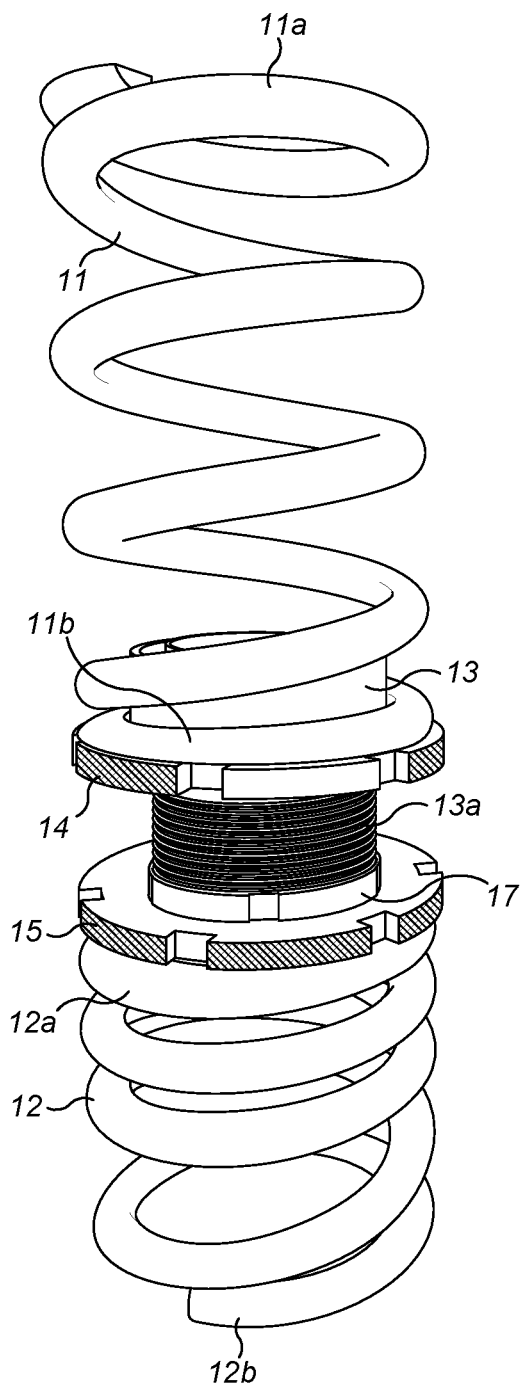
FIG. 7A is a perspective view of an embodiment of the invention which includes a lock ring as a stop for each flange.
Figure 7B:
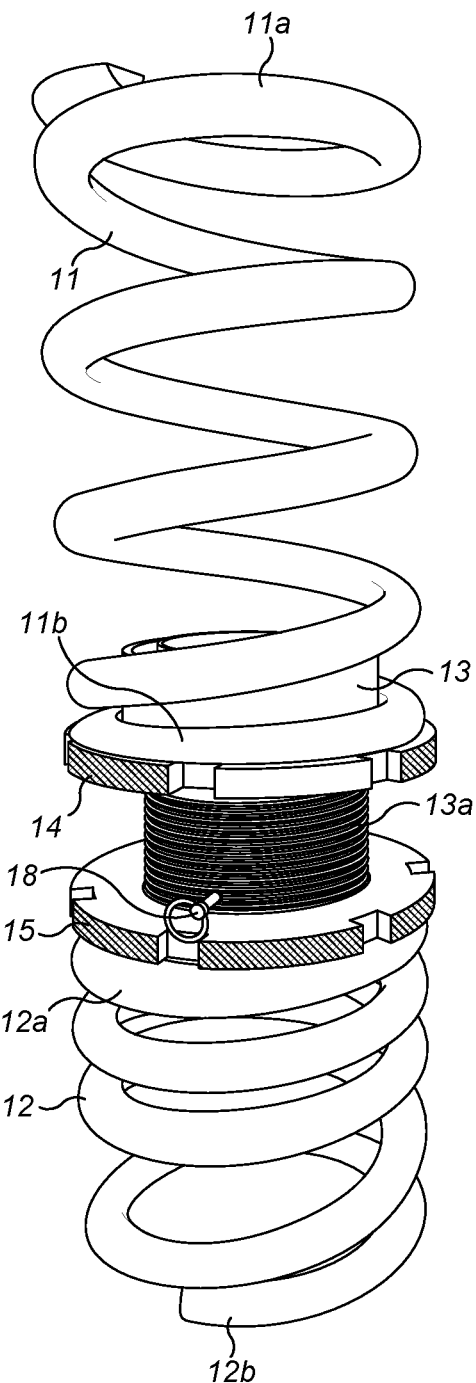
FIG. 7B is a perspective view of an alternative embodiment of the invention which includes a lock pin as a stop for each flange.

The upper flange 14, on the other hand, which is illustrated in FIGS. 6a-6b, is separately formed from the coupler and takes the form of an annular disk have a thread 14a formed on its inner surface. The upper flange 14 furthermore includes an axial extension 14b which has a reduced diameter compared with the flange 14 and is sized so as to be engageable inside the end of the windings of the abutting end 11b of the spring 11 for locating purposes. The thread 14a of the flange 14 is of complementary size to the thread 13a formed on the outer surface of the coupler 13 such that the flange 14 is threadingly engageable onto the coupler 13 and its axial position along the coupler 13 adjustable by rotating the flange 14 relative to the coupler 13. In this way, the separation between the two flanges 14, 15 can be adjusted and the loading on the spring varied.

The springs will typically be different sizes so as to provide different spring loadings, and the extensions 14b, 15b will similarly be sized to be a close fit inside the abutting spring to minimise radial movement. In particular, the extension 14b on the moveable flange will typically be sized to be larger than the extension 15b of the integrally formed flange.

Whilst the invention has been described in relation to one of the flanges being fixed, it will be understood that both flanges may be moveably mounted on coupler. Similarly, instead of a threaded coupling, other coupling types well known to the skilled person may instead be used. Stop means may also be implemented to prevent unintentional movement of the flange(s) on the coupler.

The invention claimed is:

1. A shock absorber assembly comprising at least two springs arranged in series so as, in use, to extend between a pair of spaced apart spring seats, and a coupling member arranged between the pair of adjacent ends of neighboring springs, wherein the coupling member is adjustable and is formed by a shaft having a pair of flanges provided on an outer surface thereof, the shaft extending axially beyond each of said flanges so as to extend inside the windings of the adjacent ends of the springs to locate the adjacent ends of the springs on the coupling member, each of said flanges engaging one of the adjacent ends of the neighboring springs, each of said flanges being moveable longitudinally along the shaft so as to vary a longitudinal separation between the pair of flanges and thereby vary a preload on the springs.

2. A shock absorber according to claim 1, comprising a plurality of springs arranged in series with each other so as to be distributed longitudinally between the spring seats, at least one adjustable coupler being included in line with the springs and arranged between one pair of the springs.

3. A shock absorber according to claim 2, wherein an adjustable coupler is provide between each pair of adjacent spring ends.

4. A shock absorber according to claim 1, wherein the shaft is a cylindrical member having a circular cross-section.

5. A shock absorber according to claim 1, wherein each of the flanges has a retaining collar associated with for locking it in position.

6. A shock absorber according to claim 1, further comprising stop means associated with each of the flanges to enable each of the flanges to be locked in position against unintentional longitudinal movement.

7. A shock absorber according to claim 6, wherein the stop means takes the form of one of a lock ring or nut which winds up behind the flanges, a locking collar which engages between the flanges to prevent them moving back towards each other, or locking pins.

8. A shock absorber according to claim 1, wherein an outer dimension of the shaft is sized to be a close tolerance fit inside the spring in which the shaft engages to minimize lateral movement of the springs on the coupling member.

9. A shock absorber according to claim 1, wherein one end of the shaft has a different size to the other end.

10. A shock absorber according to claim 1 wherein the shaft is hollow such that a suspension strut can extend therethrough.

11. A shock absorber according to claim 10, wherein the shaft has a thread formed on at least part of its outer surface, each of the flanges having an internal thread by means of which it mounts on the cylindrical member and is longitudinally adjustable therealong.

12. An adjustable spring coupler for a shock absorber, comprising a coupling member formed by a shaft having a pair of flanges provided on an outer surface thereof, the shaft being sized so as to extend, in use, inside windings of abutting spring ends of at least a pair of springs arranged in series between a pair of spring seats mounted on the shock absorber to locate the spring ends on the coupling member, each of said flanges engaging one of the abutting spring ends of the springs, each of said flanges being moveable longitudinally along the shaft so as to vary a longitudinal separation between the pair of flanges and thereby, in use, to vary a preload on the springs.

13. An adjustable spring coupler according to claim 12, wherein the shaft is hollow such that a suspension strut can extend therethrough.

14. An adjustable spring coupler according to claim 13, wherein the shaft is a cylindrical member having a circular cross-section.

15. An adjustable spring coupler according to claim 14, wherein the shaft has a thread formed on at least part of an outer surface of the shaft, each of said flanges having an internal thread by means of which it mounts on the cylindrical member and is longitudinally adjustable therealong.

16. An adjustable spring coupler according to claim 12, wherein each of said flanges has a retaining collar associated with for locking it in position.

17. An adjustable spring coupler according to claim 12, further comprising stop means may be associated with each of said flanges to enable each of said flanges to be locked in position against unintentional longitudinal movement.

18. An adjustable spring coupler according to claim 17, wherein the stop means takes the form of one of a lock ring or nut which winds up behind the flanges, a locking collar which engages between the flanges to prevent them moving back towards each other, or locking pins.

19. An adjustable spring coupler according to claim 12, wherein an outer dimension of the shaft is sized to be a close tolerance fit inside the spring in which the shaft engages to minimize lateral movement of the springs on the coupling member.

20. An adjustable spring coupler according to claim 12, wherein one end of the shaft has a different size to the other end.

\* \* \* \* \*